(12) United States Patent
Hoelen et al.

(10) Patent No.: US 7,588,361 B2
(45) Date of Patent: Sep. 15, 2009

(54) ILLUMINATION SYSTEM COMBINING DIFFUSE HOMOGENEOUS LIGHTING WITH DIRECT SPOT ILLUMINATION

(75) Inventors: Christoph Gerard August Hoelen, Eindhoven (NL); Cornelis Jojakim Jalink, Utrecht (NL); Nicola Bettina Pfeffer, Eindhoven (NL); Jelle Hilbrand Schuurmans, Eindhoven (NL); Stefan Marcus Verbrugh, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 732 days.

(21) Appl. No.: 10/506,276

(22) PCT Filed: Feb. 21, 2003

(86) PCT No.: PCT/IB03/00685

§ 371 (c)(1),
(2), (4) Date: Aug. 31, 2004

(87) PCT Pub. No.: WO03/075051

PCT Pub. Date: Sep. 12, 2003

(65) Prior Publication Data

US 2005/0231981 A1 Oct. 20, 2005

(30) Foreign Application Priority Data

Mar. 5, 2002 (EP) .................................. 02075880

(51) Int. Cl.
*F21V 8/00* (2006.01)
(52) U.S. Cl. ........................ 362/560; 362/606; 362/558
(58) Field of Classification Search .................. 362/650, 362/606, 608, 609, 610, 616, 617, 618, 619, 362/620, 558, 511, 330, 560
See application file for complete search history.

(56) References Cited

U.S. PATENT DOCUMENTS

| | | | |
|---|---|---|---|
| 5,485,291 A | 1/1996 | Qiao et al. | |
| 5,947,578 A * | 9/1999 | Ayres | 362/629 |
| 6,231,200 B1 | 5/2001 | Shinohara et al. | |
| 6,286,970 B1 * | 9/2001 | Egawa et al. | 362/608 |
| 6,435,687 B1 * | 8/2002 | Fukiharu | 362/609 |
| 6,547,408 B1 * | 4/2003 | Greiner | 362/625 |
| 6,563,998 B1 * | 5/2003 | Farah et al. | 385/131 |
| 2001/0038539 A1 | 11/2001 | Lea et al. | |

OTHER PUBLICATIONS

Merriam-Webster's Collegiate Dictionary, 10th edition, p. 982.*

* cited by examiner

*Primary Examiner*—Sharon E Payne

(57) ABSTRACT

An illumination system, preferably for illumination in a car, comprising at least one plain or slightly curved, solid light guide (4) made of transparent material, said light guide receiving light from a light (2) source and being provided with means (5, 6) for extracting light from said light guide, the means for extracting light from said light guide have. Reflecting surfaces (7, 8, 9, 10) the slopes of which are varied as a function of the position of the extracting means in the light guide as well as the position of a reading plane, so as to direct the light flux to a desired reading plane position. Preferably the illumination system a laminated structure of light guide layers, said layers being formed of a light guide layer for diffuse homogeneous illumination (1) and at least one light guide layer (4) for spot illumination of a reading plane.

13 Claims, 2 Drawing Sheets

ILLUMINATION SYSTEM COMBINING DIFFUSE HOMOGENEOUS LIGHTING WITH DIRECT SPOT ILLUMINATION

The invention relates to an illumination system comprising at least one plain or slightly curved, solid light guide made of transparent material, said at least one light guide receiving light from a light source, said at least one light guide being provided with means for extracting light from said light guide.

The invention is especially of importance for application in the automotive industry, is however not limited thereto.

Lighting plays a valuable role in the way the car's environment is perceived and this in turn determines the drivers' and passengers' comfort. While up to now functional lighting applications (e.g. switch indicators and reading lamps have dominated the car interior, these do not contribute significantly tom its humanization. Ambient, orientation and contour lighting applications reveal real value of a car's interior environment.

Especially in the confined space of a car's interior the lighting level and distribution is one of the important features relating to the light source. Lighting level and distribution are inherently connected to driver safety and comfort for passengers.

Prior art, WO 99/64785, publication date 16 Dec. 1999, describes a light distribution system in which for extracting light from a light guide cuts are made into the light guide which extend through, or partly trough said light guide at a constant predetermined angle relative to the normal of the surface through which the light has to be extracted.

It is an object of the present invention to improve the mentioned light distribution system of the prior art in such a way that a light illumination system is obtained with at least one reading light as a an improved directed spot illumination.

According to the present invention the illumination system comprising at least one plain or slightly curved, solid light guide made of transparent material, said at least one light guide receiving light from a light source, said at least one light guide being provided with means for extracting light from said light guide, is characterized in that means of the illumination system for extracting light from said light guide have reflecting surfaces the slopes of which are varied as a function of the position of the extracting means in the light guide as well as the position of a reading plane, so as to direct the light flux to a desired reading plane position.

In contrary to the system of the prior art, the reflecting surfaces with varying slope provide for an excellent reading spot function of restricted area, e.g. an A4 size.

According to a very important further object of the present invention the illumination system comprises a combination of the solid light guide having reflecting surfaces the slopes of which are varied as a function of the position of the extracting means in the light guide as well as the position of the reading plane, so as to direct the light flux to a desired reading plane position, and at least a solid light guide for diffuse background illumination, said reading plane being at least one restricted area with respect to the background illumination area. This combination of a large area of agreeable diffuse homogeneous lighting with restricted reading spot areas really enhances the comfort e.g. for driver and passengers in a car.

In a preferred embodiment of the present invention the means for extracting light from said light guide to a reading place comprise V-shaped grooves in the at least one solid light guide, the slope of the reflecting surfaces of the grooves are varied as a function of the position of the extracting means in the light guide as well as the position of the reading plane, so as to direct the light flux to a desired reading place position. This embodiment has the advantage of relative simple manufacturing A further embodiment of the invention is characterized in that the means for extracting light from said light guide to a reading place comprise laser cuts in the at least one solid light guide, the slope of the reflecting surfaces of the laser cuts are varied as a function of the position of the extracting means in the light guide as well as the position of the reading plane, so as to direct the light flux to a desired reading place position. Although a more complicated manufacturing method, this embodiment may have advantages for very thin light guides.

In a preferred embodiment the illumination system may have a laminated structure of light guide layers, said layers being formed of a light guide layer for diffuse homogeneous illumination and at least one light guide layer for spot illumination of a reading plane.

The invention will hereinafter be described with reference to the accompanying drawing. In the drawing.

Figure 3:
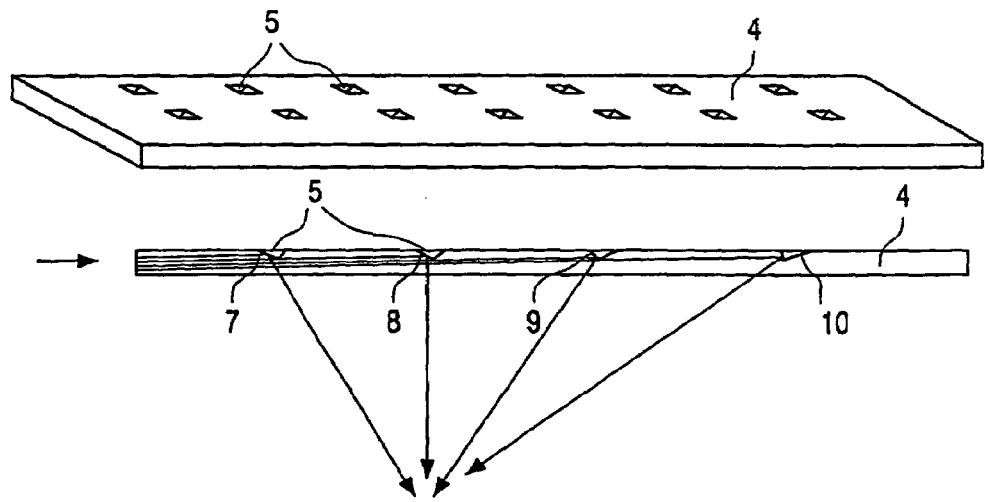
Figure 4:
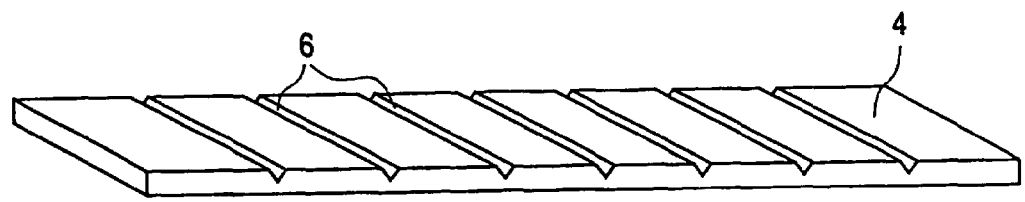
Figure 5:
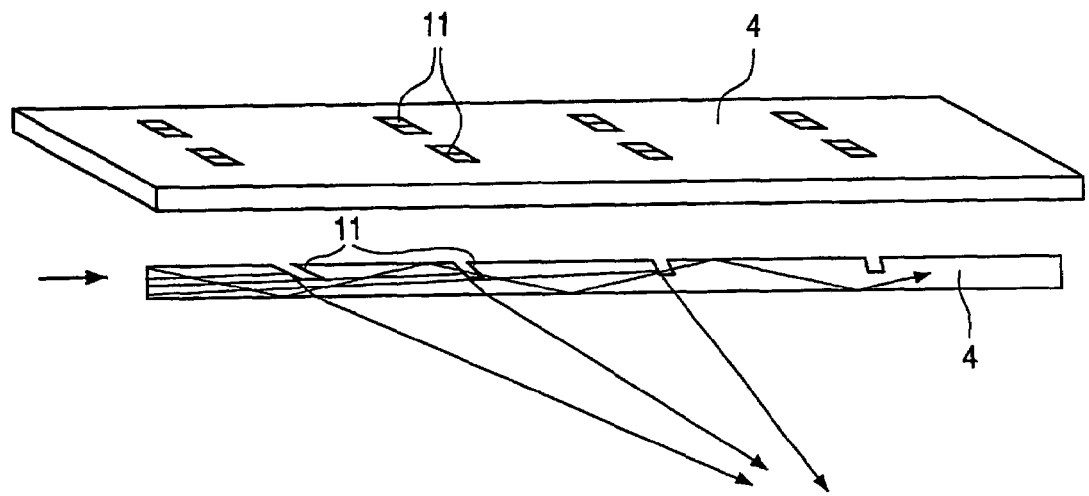
Figure 6:
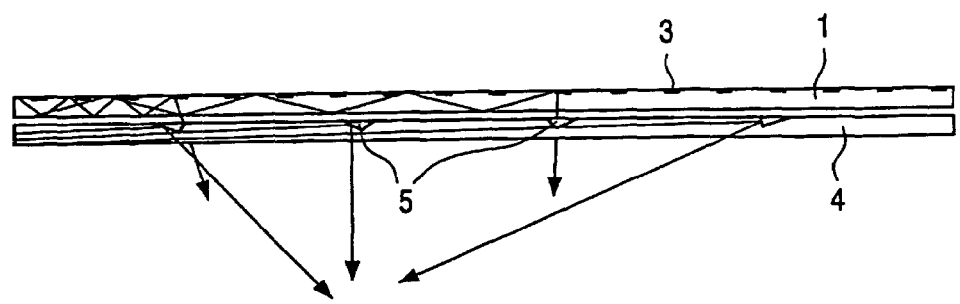

FIG. 3 illustrates a perspective view and a side view of a light guide for directed spot illumination, FIG. 4 illustrates a further embodiment for directed spot illumination, FIG. 5 Shows an example of a light guide for directed spot illumination, provided with laser cuts, and FIG. 6 is a schematic view of the combination of a light guide for diffuse illumination and a light guide for directed spot illumination.

Figure 1:
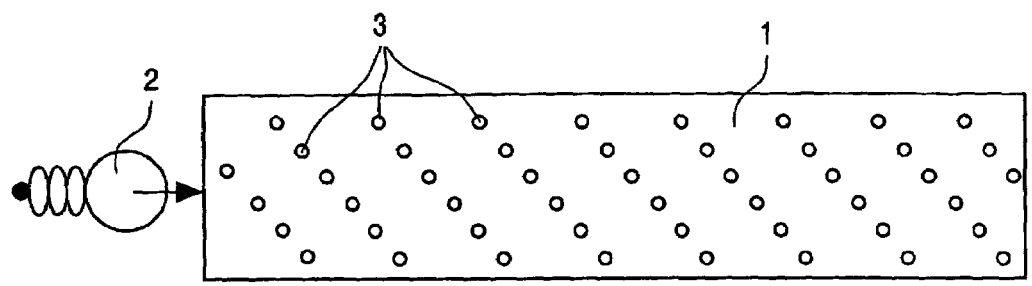
FIG. 1 shows schematically a light guide for a homogeneous light distribution.
Figure 2:
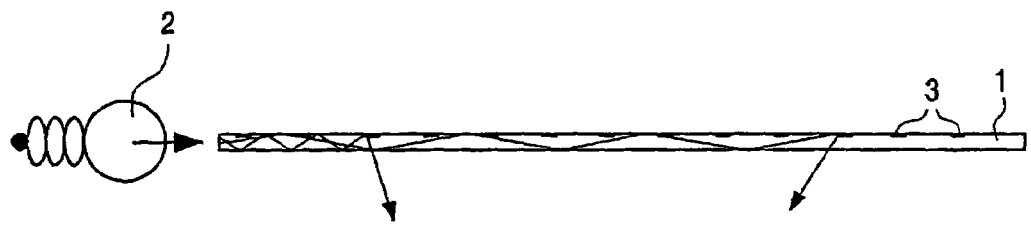
FIG. 2 shows a side view of the light guide of FIG. 1.

FIGS. 1 and 2 show a light guide 1 that e.g. could be used for automotive application, to be applied to the roof of a car. This light guide can be plane or slightly curved. The guide is commonly made of a transparent material such as glass, polycarbonate, acryl, etc. Light is to be coupled into the guide e.g. at the front, and is kept in side by total internal reflection. Preferable the light is coupled in the guide by a compact high performance incandescent lamp and optical fibers, schematically indicated with reference numeral 2. In a car this has the advantage that only restricted space is needed for the light source. The light guide can e.g. be provided with dots of paint 3, preferably regularly divided over the total surface of the light guide. In this way a homogeneous diffuse lighting can be obtained, e.g. over large part of the roof of a car, giving a pleasant feeling for driver and passengers. Instead of spots of paint the dots can be matted. The thickness of the light guide can be made small, e.g. 3 mm.

FIG. 3 shows a light guide 4 for directed spot illumination. In the guide a number of wedges 5 is provided, in V-shape. FIG. 4 shows The light pipe 4 for directed illumination with V-shaped grooves 6. These grooves are shown straight, but may also be somewhat rounded. The wedges or grooves are acting as extracting means for light so as to direct the light to a desired position, commonly a reading plane position in a car. As can be seen in FIGS. 3 and 4 the wedges, or the grooves, have reflecting surfaces 7, 8, 9, 10 the slope of which is varied as a function of their position in the guide 4, 5. Due to this varying slope as function of the position in the guide a bright illumination can be obtained in a reading plane of any desired size, e.g. of a A4 size for a passenger in a car.

FIG. 5 shows a light guide 4 for spot illumination, in which the reflecting surfaces are formed by laser cuts In FIG. 6 the combination is shown of a light guide 1 for diffuse illumination and a light guide 4 for spot illumination. This combination is formed has a laminated structure as a preferred embodiment of the invention. The structure may also have more than one guide light layer for spot illumination. Furthermore the layer for diffuse illuminate may be provided at the lower side of the structure.

Advantageously the upper surface of the structure is provided with a mirror like coating, so as to prevent loss of light in the upward direction.

As a non limiting example, a structure of light guides consisted of two 3 mm thick light guides on top of each other. The lower 900×600 mm light guide offers a low level ambient or orientation function. The upper 300×300 mm light guide is illuminated separately from the lower light guide and offers a reading spot function. With an initial flux of 300 lm from the light source it was possible to create a 120 lux spot of a 2×A4 size.

The invention claimed is:

1. An illumination comprising at least one plain or slightly curved, solid light guide made of transparent material, said at least one solid light guide receiving light from a light source, said at least one solid light guide being provided with a light extraction surface through which light emerges from the light guide, and means for extracting light from said one solid light guide through the light extraction surface, wherein the means for extracting light from said one solid light guide has reflecting surfaces with slopes, the slope of each reflecting surface being different from the slopes of the other reflecting surfaces, the slopes being varied as a function of the position of the extracting means in the light guide as well as the position of a reading plane, so as to direct the light flux to a desired reading plane position, said reading plane being a restricted area with respect to the light extraction surface.

2. The illumination system according to claim 1, wherein the system comprises a combination of the at least one solid light guide and at least one second solid light guide for diffuse background illumination.

3. The illumination system according to claim 1, wherein the means for extracting light from said at least one solid light guide comprise V-shaped grooves in the at least one solid light guide, the slope of the reflecting surfaces of the grooves are varied as a function of the position of the extracting means in the at least one solid light guide as well as the position of the reading plane, so as to direct the light flux to the desired reading plane position.

4. The illumination system according to claim 1, wherein the means for extracting light from said light guide comprise laser cuts in the at least one solid light guide, the slope of the reflecting surfaces of the laser cuts are varied as a function of the position of the extracting means in the light guide as well as the position of the reading plane, so as to direct the light flux to the desired reading plane position.

5. The illumination system according to claim 2, wherein the at least one second solid light guide is on a main surface provided with a pattern of dots of paint or matted dots, said pattern being a regular array.

6. The illumination system according to claim 1, wherein the system has a laminated structure of light guide layers, said layers being formed of a light guide layer for diffuse homogeneous illumination and at least one light guide layer for spot illumination of a reading plane.

7. The illumination on system according to claim 1, wherein an upper main surface of the at least one solid light guide, opposite the light extraction surface, is provided with a mirror-like coating.

8. Illumination system comprising at least one plain or slightly curved, solid light guide made of transparent material, said at least one solid light guide receiving light from a light source, said at least one solid light guide being provided with means for extracting light from said light guide, the means of the illumination system for extracting light from said light guide having reflecting surfaces with slopes, the slopes being varied as a function of the position of the extracting means in the light guide as well as the position of a reading plane, so as to direct the light flux to a desired reading plane position, characterized in that the system has a laminated structure of light guide layers, said layers being formed of a light guide layer for diffuse homogeneous illumination and at least one light guide layer for spot illumination of a reading plane.

9. The illumination system of claim 1, wherein the means for extracting light from said light guide directs the light flux to the desired reading plane position so as to create a reading plane of a size different from a size of the light extraction surface.

10. An illumination system comprising at least one plain or slightly curved, solid light guide made of transparent material, said at least one solid light guide receiving light from a light source, said at least one solid light guide being provided with a light extraction surface through which light emerges from the light guide, and means for directing light from said one solid light guide through the light extraction surface to illuminate a selected spot of limited size at any particular distance from the light extraction surface, wherein the means for directing light from said one solid light guide through the light extraction surface has reflecting surfaces with slopes, the slope of each reflecting surface being different from the slopes of the other reflecting surfaces, the slopes being varied as a function of the position of the extracting means in the light guide so as to direct the light through the light extraction surface to the selected spot.

11. The illumination system of claim 10, wherein the system comprises a combination of the at least one solid light guide and at least one second solid light guide for diffuse background illumination.

12. The illumination system of claim 10, wherein the means for extracting light from said at least one solid light guide comprise V-shaped grooves in the at least one solid light guide, the slope of the reflecting surfaces of the grooves are varied as a function of the position of the extracting means in the at least one solid light guide.

13. The illumination system of claim 10, wherein the means for extracting light from said light guide comprise laser cuts in the at least one solid light guide, the slope of the reflecting surfaces of the laser cuts are varied as a function of the position of the extracting means in the light guide.

* * * * *